United States Patent [19]

Weinkauf

[11] Patent Number: 5,839,743
[45] Date of Patent: Nov. 24, 1998

[54] GRADER FENDERS

[75] Inventor: Frank Weinkauf, Naicam, Canada

[73] Assignee: Fenderco Enterprises Ltd., Naicam, Canada

[21] Appl. No.: 701,044

[22] Filed: Aug. 21, 1996

[51] Int. Cl.$^6$ .................................................. B62D 25/16
[52] U.S. Cl. .......................... 280/154; 280/848; 172/509
[58] Field of Search .................................. 280/762, 847, 280/848, 851, 154, 156, 157; 172/509; 248/299

[56] References Cited

U.S. PATENT DOCUMENTS

| 2,530,857 | 11/1950 | Campbell . | |
|---|---|---|---|
| 3,497,237 | 2/1970 | Vis . | |
| 3,506,282 | 4/1970 | Miyanaga . | |
| 5,074,513 | 12/1991 | Dick | 280/157 |
| 5,169,167 | 12/1992 | Willson et al. | 280/157 |
| 5,511,808 | 4/1996 | Rowland | 280/157 |

FOREIGN PATENT DOCUMENTS

| 1127209 | 7/1982 | Canada . |
| 1148585 | 6/1983 | Canada . |
| 1158282 | 12/1983 | Canada . |

*Primary Examiner*—Richard M. Camby
*Attorney, Agent, or Firm*—Murray E. Thrift; Adrian D. Battison

[57] ABSTRACT

The present invention relates to fender assemblies for use with road graders and the like that prevent mud, dust, snow, or other substances on the ground or road surface from being thrown up by the grader tires. The fenders are arranged to follow any vertical movement of the grader wheels, are low cost, and easily removable and light-weight so that maintenance and servicing can be performed on the grader easily.

17 Claims, 7 Drawing Sheets

GRADER FENDERS

FIELD OF THE INVENTION

The present invention relates to fender assemblies for use with road graders and the like.

BACKGROUND OF THE INVENTION

Currently tractor road graders are not equipped with fenders to protect the chassis and cab of the vehicle from mud, dust, snow, or other substances on the ground or road surface from being thrown up onto the vehicle by the grader tires. This can lead to dangerous situations if the windshield of the cab becomes covered with one of these substances to a extent where it is no longer possible for the driver to see where he is driving.

The lack of fenders on most road graders also creates a problem with keeping the vehicle clean. This results in increased cleaning costs and lost time for the owner of the vehicle.

Fender arrangements have been proposed in an effort to solve these problems. These fenders have not proven satisfactory. The prior fenders have been metal structures mounted on the grader by brackets that are welded onto the grader. During maintenance or servicing these fenders sometimes need to be removed. Once removed these metal fenders are heavy and difficult to handle. If it is necessary to remove the mounting brackets, this involves cutting off the brackets and re-welding them when the fenders are to be reinstalled. Graders with this type of fender have often had them removed for maintenance or servicing and then discarded rather than have the fenders and mounting brackets reattached due to the difficulty and expense involved in doing so.

These problems are shared by most types of vehicular heavy equipment. A number of attempts have been made to remedy some of these problems on tractor trucks, farm tractors, and tractor loaders none of which are specific to road graders.

Vis in U.S. Pat. No. 3,497,237 issued Feb. 28, 1968 discloses a front fender for a wide track farm tractor. The fenders mount on the steering arm of the front suspension of the tractor by a bracket and U-bolt arrangement. This arrangement would not work on a grader since the steering mechanism of a grader is different from that of a tractor and this causes problems when turning the vehicle. The fenders proposed by Vis follow the front wheels as the wheels turn when turning the vehicle. On a grader this arrangement would cause a collision between the fender and the chassis of the grader. As well the fenders proposed by Vis cannot move horizontally to follow a grader wheel as its camber changes thereby reducing the coverage provided by the fenders. Finally the fenders proposed by Vis are heavy being made of metal and can not easily be removed from their mounting brackets.

Gershiem in Canadian patent 1,127,209 issued Jul. 6, 1982 discloses a tiltable fender for a tractor loader. The tiltable fender mounts over the rear drive wheels and is split into two pieces one of which tilts outwards away from the chassis of the vehicle allowing access to the engine compartment. This arrangement solves the problem of gaining access to the engine compartment for maintenance however difficulties may still occur if maintenance is required on other parts of the vehicle since half of the fender remains fixed. The Gershiem fenders mount on the chassis of the vehicle and do not move with the wheels and therefore they can not work on a grader since there is significant vertical movement of the grader drive wheels. Since the Gershiem fenders can not follow the vertical movement of these wheels collisions would occur between the wheels and the fenders. The Gershiem fenders also have the additional disadvantage of being more complex than non-tilting fenders making them more costly.

A practical fender assembly is required for road graders that will prevent mud, dust, snow, or other substances on the ground or road surface from being thrown up by the grader tires. As well these fenders need to follow any vertical movement of the grader wheels, be low cost, easily removable, and light-weight so that maintenance and servicing may be performed on the grader easily.

SUMMARY OF THE INVENTION

According to one aspect of the current invention there is provided a fender assembly for a road grader wheel. The assembly comprises a fender of resilient synthetic plastic material configured to extend over a part of the periphery of the wheel, and a bracket. The bracket comprises a standard; standard mounting means at a bottom end of the standard for securing the standard to a part of the grader that is adjacent the wheel and movable with the wheel, and fender mounting means at a top end of the standard and comprising releasable and reengageable fastening means for releasably fastening the fender to the standard. The fender remains spaced a substantially constant distance from the wheel, and positioned over part of the periphery of the wheel.

In one embodiment the standard comprises a substantially flat plate with standard mounting means. The standard mounting means comprise a portion of the plate configured to engage a substantially flat bolt flange of a drive wheel chain case of the grader. The plate has bolt holes for alignment with bolt holes in the bolt flange. The fender mounting means comprise a fender support frame cantilevered from the top end of the standard and fastening means comprising a plurality of pins projecting upwardly from the fender support frame, a plurality of openings in the fender for engagement over the pins, and retainer means for engaging the pins to retain the fender thereon.

In a second embodiment the standard comprises a column, with standard mounting means comprising clamping means for clamping the bottom end of the standard to a suspension arm of a grader steerable wheel suspension.

The standard is mounted on the suspension arm such that the standard will move laterally when the wheels of the grader are cambered. The fender mounting means comprise an arm cantilevered from the top end of the standard and at least one mounting strap secured to and extending across the arm. Bolts and nuts secure each mounting strap to the fender. The fastening means comprise a plurality of openings in each fender, a plurality of openings in the mounting straps for alignment with the openings in the fender, and bolts and nuts for engaging through the aligned openings thereby securing each mounting strap to the fender.

The fenders are for use with a road grader having a plurality of wheels and fender assemblies for at least two of said wheels, each fender assembly comprising: a fender of resilient synthetic plastic material extending over a part of the periphery of a respective wheel; a bracket comprising: a standard; standard mounting means at a bottom end of the standard securing the standard to a part of the grader that is adjacent the associated wheel and that is movable with the associated wheel; fender mounting means at a top end of the standard and comprising releasable and reengageable fastening means releasably fastening the fender to the standard.

The road grader includes a plurality of wheels and two chain cases mounted as walking beams on opposite sides of the grader. The wheels include four drive wheels arranged in pairs with the wheels of each pair being mounted in tandem on a respective one of the chain cases. A chain cover comprises a substantially flat bolt flange and chain case assembly bolts extending into the bolt flange. The fender assembly includes openings in each respective fender to engage the fastening means of any one respective fender mounting means.

Although primarily of use on road graders the fenders and fender mounting means may also be of use on other types of vehicles.

DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
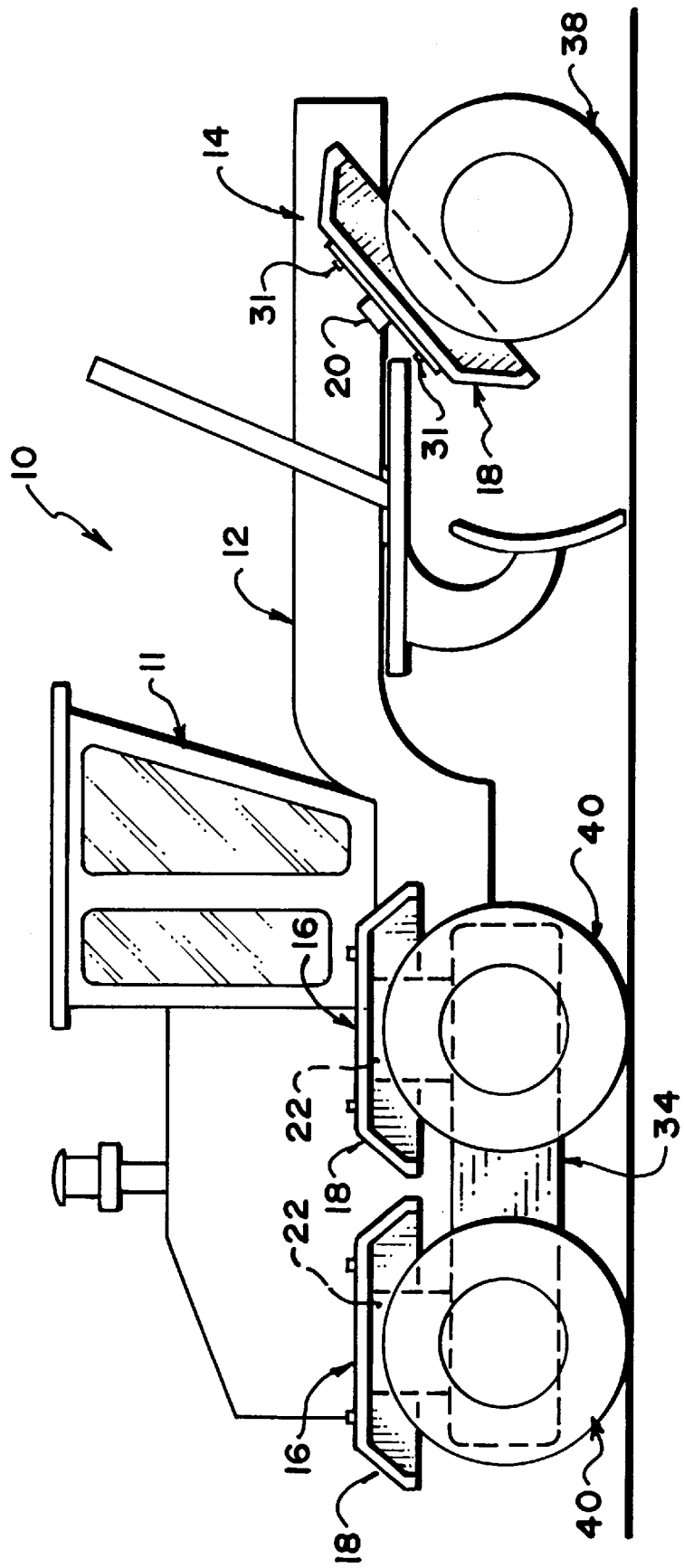
FIG. 1 is a side view of a tractor road grader with the fenders installed.

Referring to the accompanying figures a road grader 10 is shown having mounted on it the preferred embodiment of front and rear fender assemblies 14 and 16.

The road grader consists of a cab 11 supported on a chassis 12. The chassis 12 is in turn supported at the front by a front suspension 36 and a pair of front wheels 38 mounted on the suspension, one wheel on each side of the grader 10. The rear of the chassis 12 is supported by two chain cases 34 mounted as walking bars on opposite sides of the grader and a pair of rear wheels 40 on each chain case.

Both the front and rear fender assemblies consist of a fender 18, and a mounting bracket 20 or 22 to hold the fenders in place. Each front mounting bracket 20 is mounted on a portion of the front suspension 36 with the front fender extending over a part of the periphery of a front wheel 38. Each rear fender bracket 22 is mounted on the chain case 34 with the respective rear fender extending over a part of the periphery of a rear wheel 40.

Figure 2:
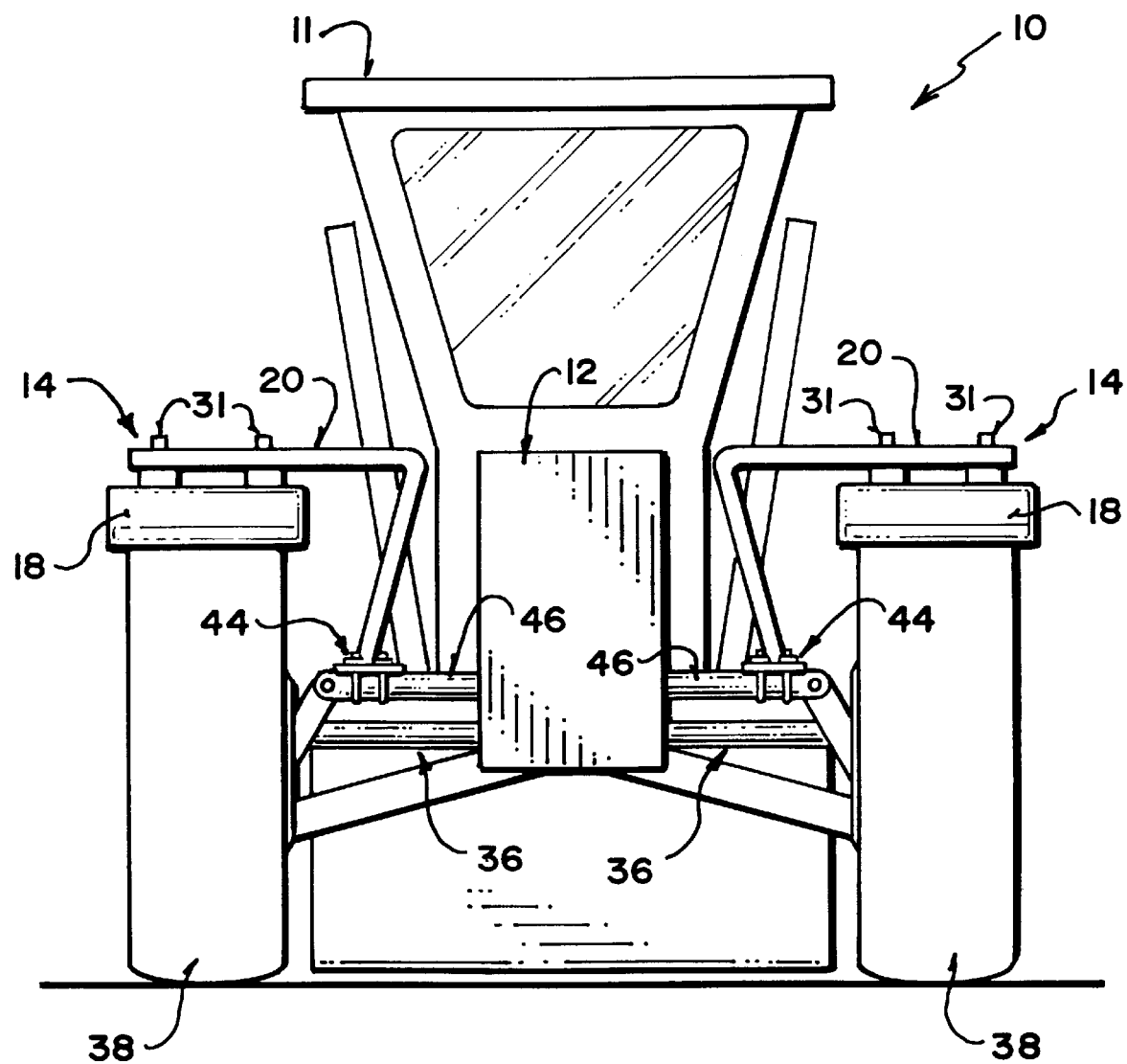
FIG. 2 is a front view of a tractor road grader with the fenders installed.
Figure 3:
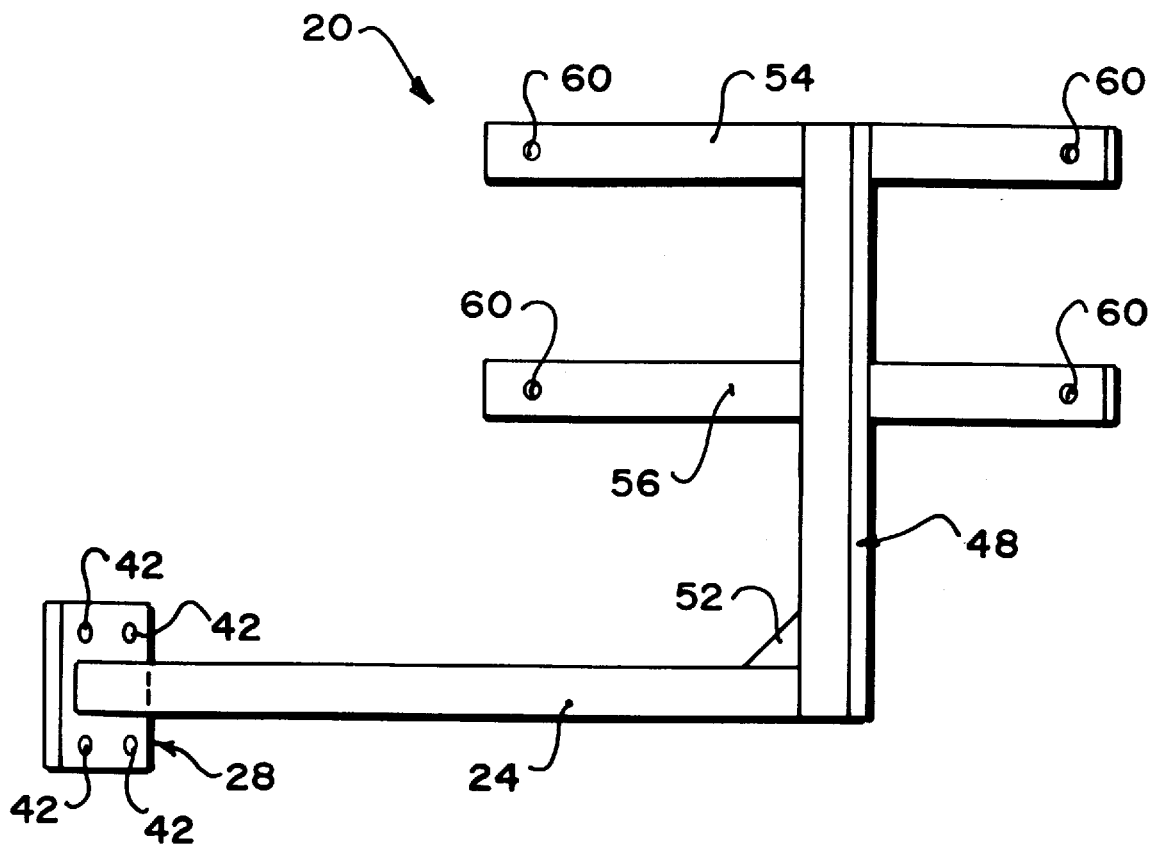
FIG. 3 is a top view of the front fender mount.
Figure 4:
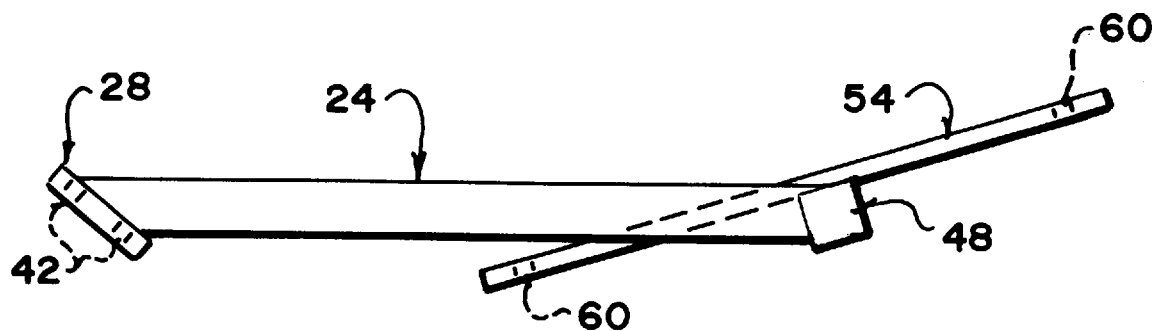
FIG. 4 is a front view of the front fender mount.

Referring to FIGS. 2, 3 and 4 the front fender mounting bracket 20 has a columnar standard 24 with a rectangular plate 28 fixed at an angle at its bottom. The rectangular plate has at each of its four corners a hole 42 for accepting the ends of two U-bolts 44 which clamp the bracket onto a suspension arm 46 of the front suspension 36. The U-bolt 44 and plate 28 may be replaced with any suitable means for fixing the bracket to the front suspension.

The suspension arm 46 and therefore the front fender assembly 14 follows the movement of the wheel 38. This allows the fender 18 to remain spaced a substantially constant distance from the wheel 38 and maintain its position over part of the periphery of the wheel 38 thereby preventing damage to the fenders 18 by collisions with the wheels 38.

Since the columnar standard 24 is mounted on the suspension arm 36 it will also move laterally when the wheel 38 of the grader is cambered. Also since the columnar standard 24 is not mounted on the steering arm 36 of the grader, as has been the case with cycle type fenders in various vehicular applications, the standard 24 does not follow the wheel 38 as the wheel 38 rotates when turning the vehicle but instead remains fixed relative to the wheel 38 thereby preventing a collision between the fender 18 and the chassis 12 of the grader.

An arm 48 is cantilevered from the top end of the standard 24 and projects away from the chassis 12 of the grader outwards and over the front wheel 38. The arm 48 is mounted at an angle to the standard 24 and is reinforced at the joint by a triangular web 52.

A pair of mounting straps 54, 56 are spaced apart along the arm 48 and fixed perpendicularly thereto at there centres such that they extend out from the arm. Near the end of each strap is a hole 60 for accepting a nut and bolt arrangement 31 for fixing the fender 18 in place.

Figure 5:
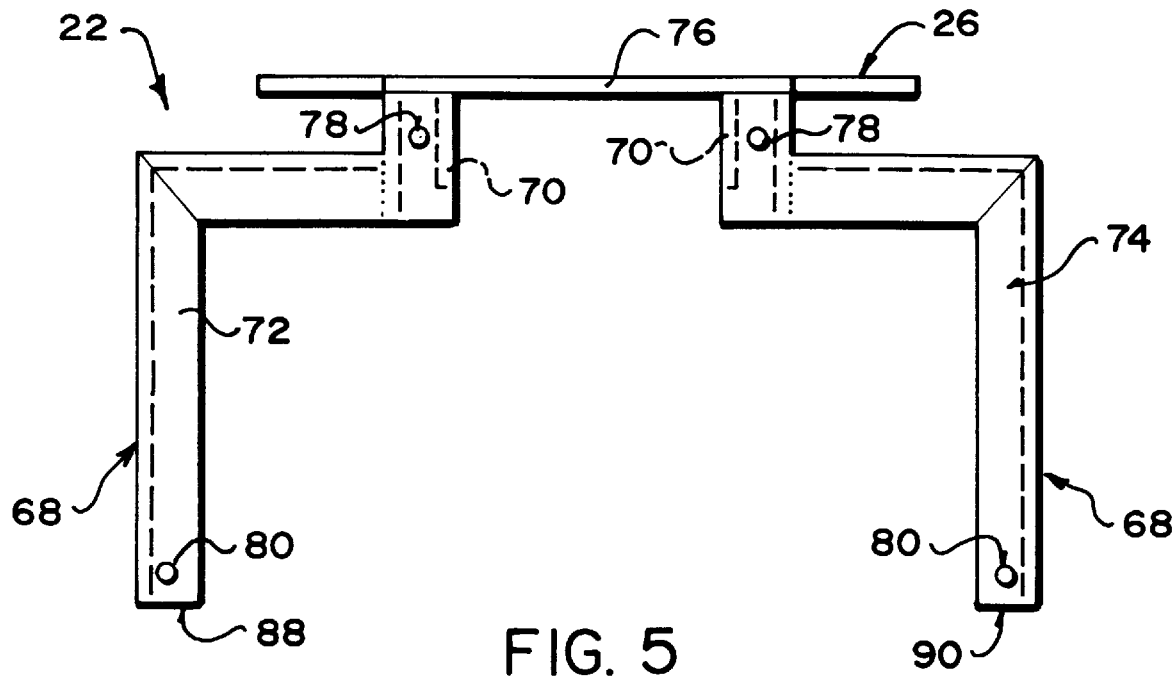
FIG. 5 is a top view of the rear fender mount.
Figure 7:
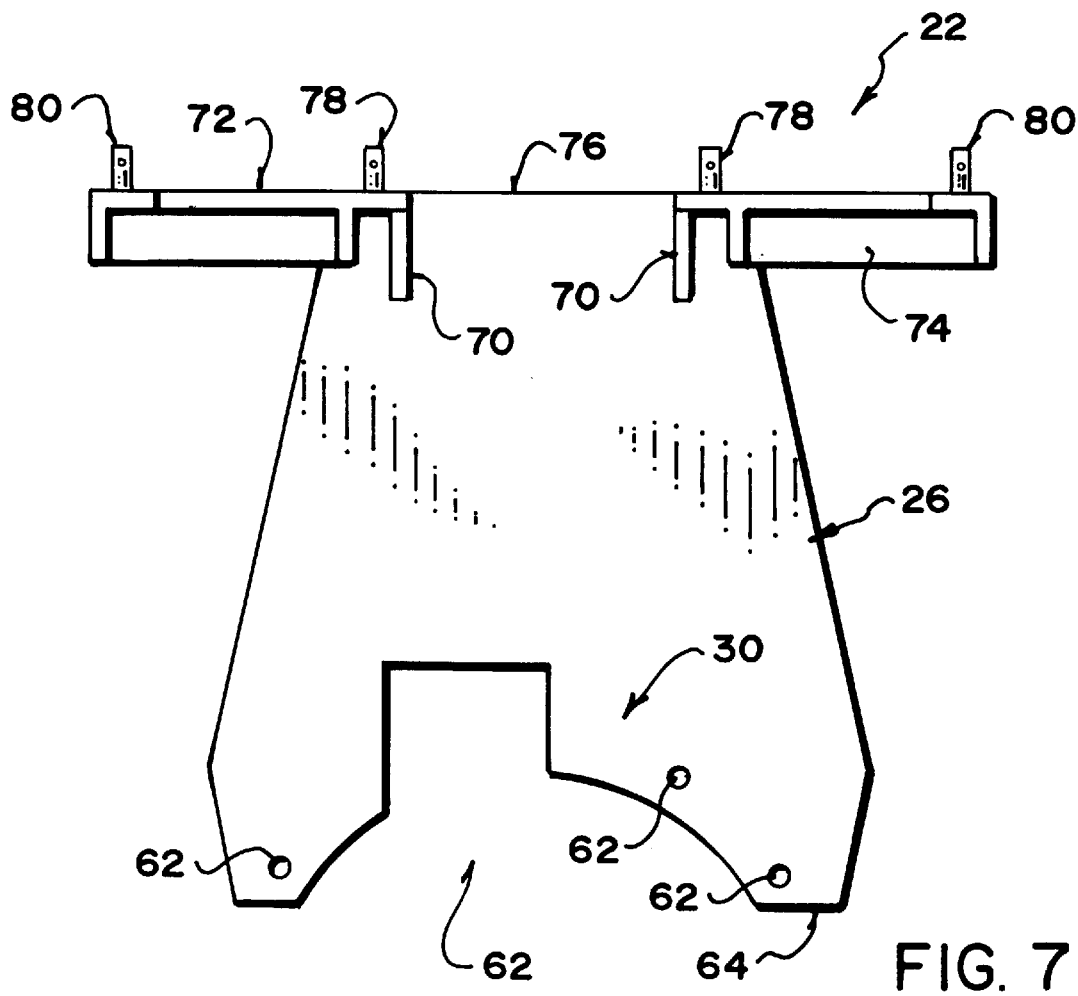
FIG. 7 is a front view of the rear fender mount for a Champion grader.
Figure 8:
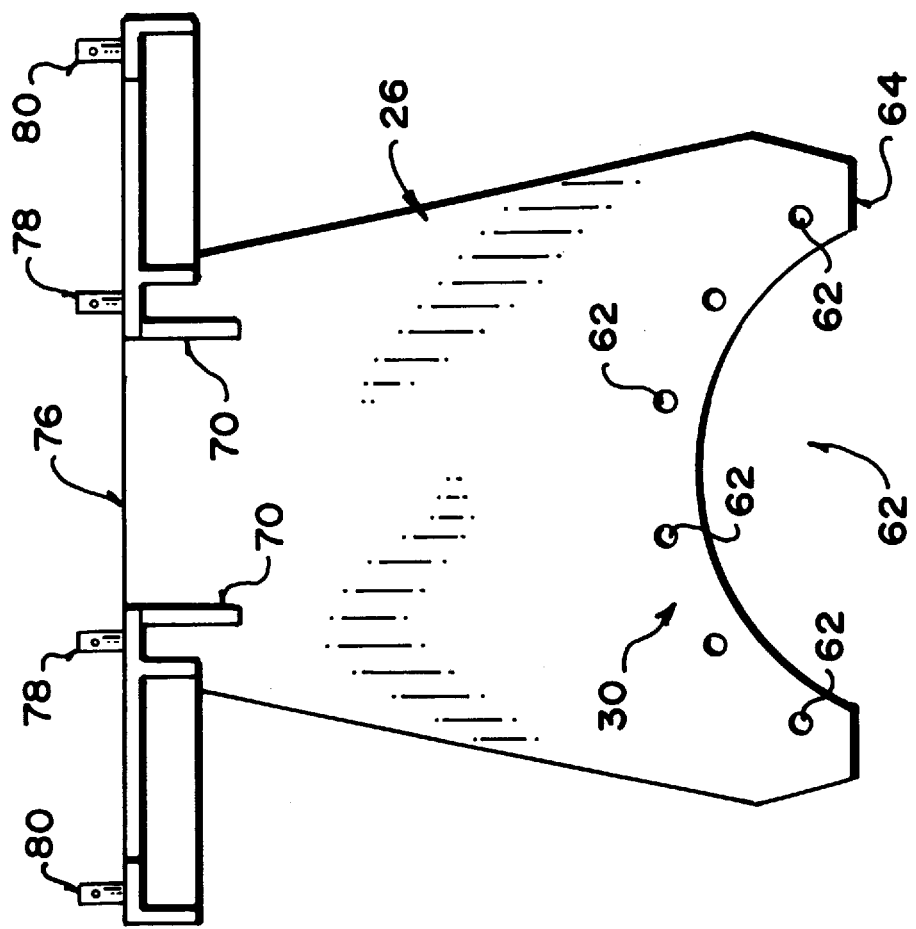
FIG. 8 is a front view of the rear fender mount for a John Deere grader.
Figure 6:
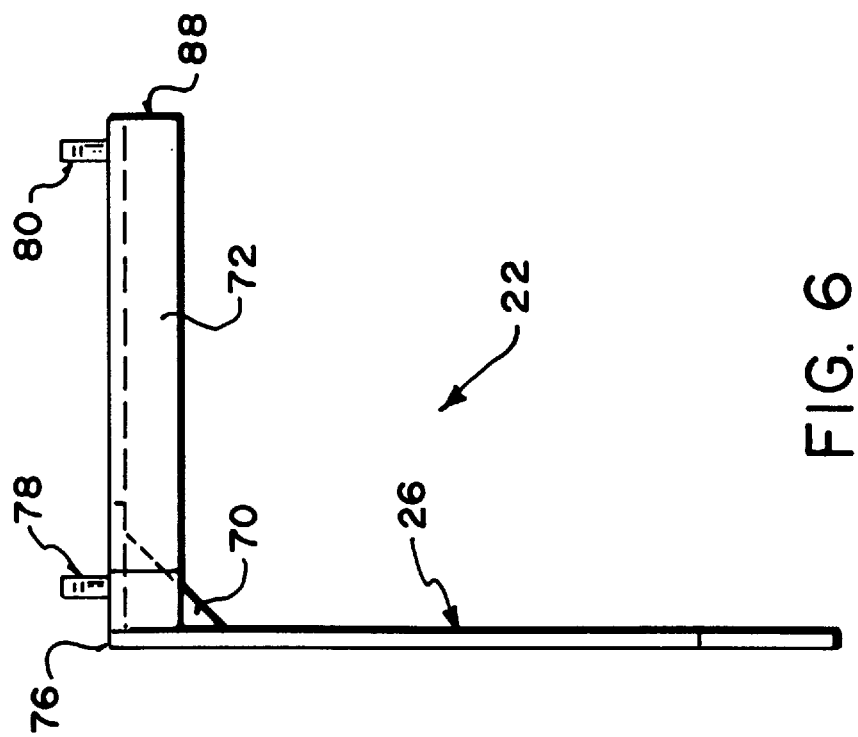
FIG. 6 is a side view of the rear fender mount.
Figure 9:
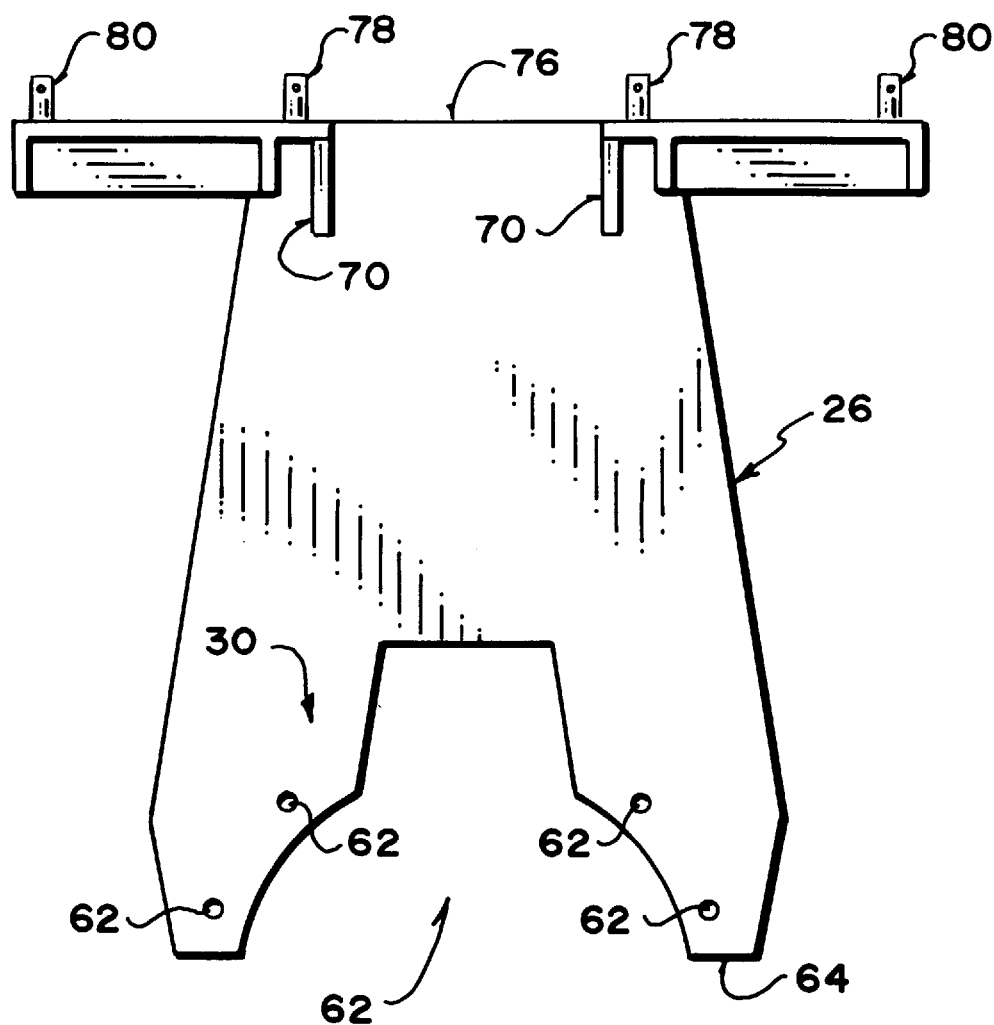
FIG. 9 is a front view of the rear fender mount for a Caterpillar grader.

Referring to FIGS. 5, 6 and 7 the rear fender mounting bracket 22 has a rear standard 26 which is a substantially flat plate having standard mounting means 30 located near the bottom of the standard. The standard mounting means consist of a number of holes and cutouts 62 at or near the bottom of the plate 64 for fixing it to the chain case. The holes in the plate are spaced so as to align with existing bolts and bolt holes located on the chain case 34 of the grader. Various arrangements of holes exist to fit the chain cases of different manufacturers' graders. (FIGS. 7, 8, and 9)

Locating the rear mounting bracket on the chain case 34 allows the fender of each rear fender assembly 16 to remain spaced a substantially constant distance from the wheel and its position over part of the periphery of the wheel as it follows the motion of each wheel 40 thereby preventing damage to the fenders by collisions with the wheels 40.

A fender support frame 68 is cantilevered from the top of the rear standard 26 projecting away from the chassis 12 of the grader and over a rear wheel 40. The fender support frame 68 is mounted perpendicular to the standard 26 and is reinforced at the joint by triangular webs 70. The support frame 68 consists of two arms 72 and 74 spaced apart along the top edge 76 of the rear standard.

Figure 13:
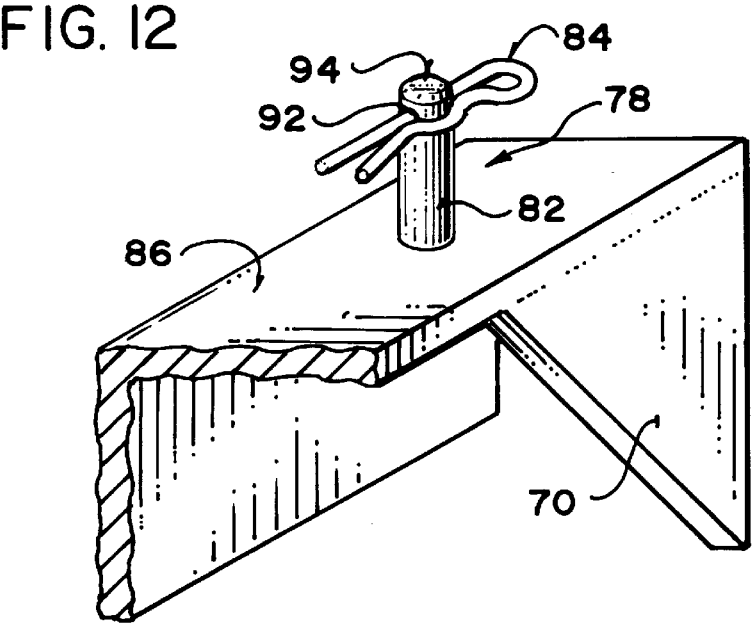
FIG. 13 isometric view of the pin and clip fasteners.

Referring to FIGS. 5 and 13 a pair of releasable and reengagable fender mounting means 78 and 80 are located on each arm 72 and 74 in the form of a pin 82 and clip 84 arrangement. The pins are fixed to the arm on its upper surface 86 projecting upwards. One pin is positioned towards each end of the arm 88 and 90. Each pin has a hole 92 located near its upper end 94 for accepting a spring clip 84 which holds the fender in place.

Figure 10:
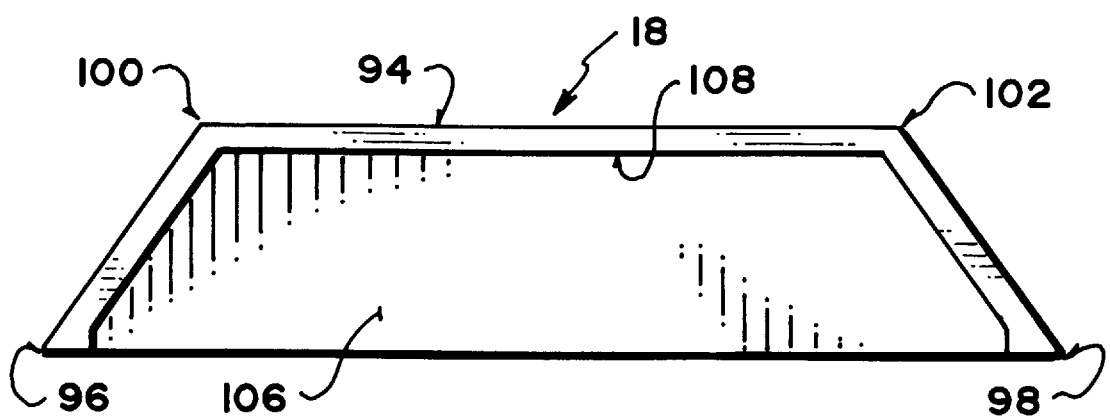
FIG. 10 front view of the removable fender.
Figure 11:
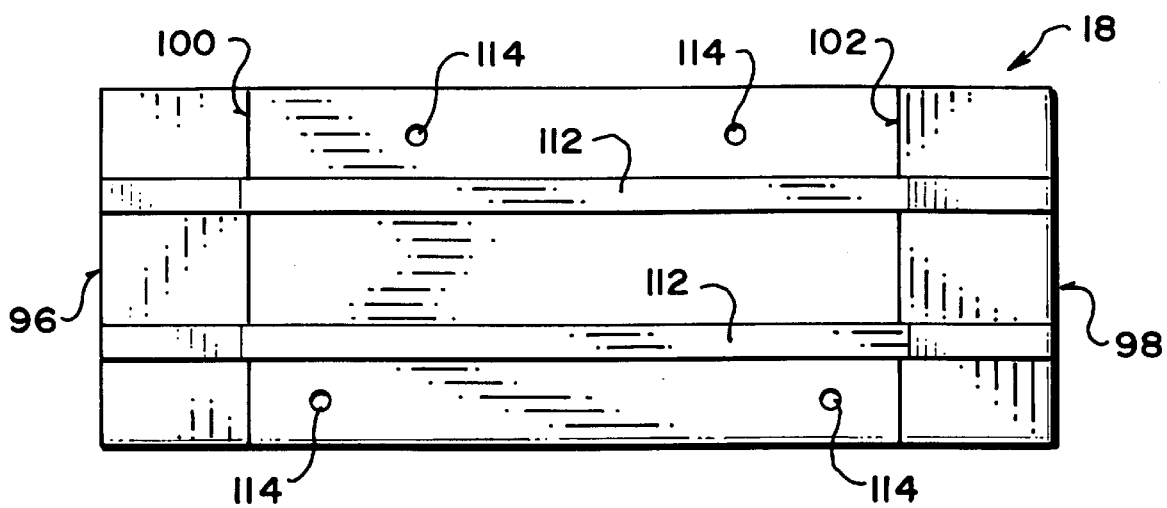
FIG. 11 top view of the removable fender.
Figure 12:
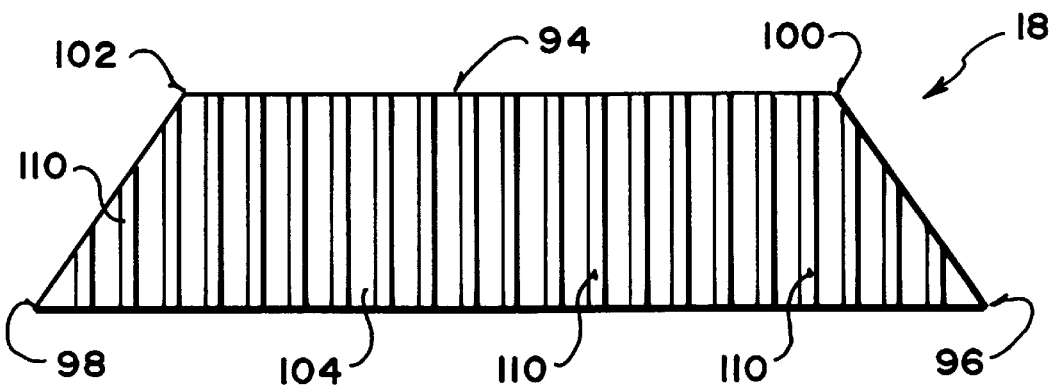
FIG. 12 rear view of the removable fender.

Referring to FIGS. 10, 11, and 12 the fender 18 is made of resilient synthetic plastics material. The fender has an upper surface 94 which extends between edges 100 and 102 spaced in from each end and then angle downwards to each end 96 and 98 starting at points.

A closed face 104 projects downwards from the upper surface 94 of the fender on the side of the fender nearest the chassis 12. The closed face is positioned between the chassis 12 and the inner side of the tire spaced a distance from both. Opposite the closed face 104 is an open outer face 106. Along the edge of the open face is a lip 108 projecting downwardly from the upper surface 94.

To add strength and rigidity to the fender 18 vertical ribs 110 are located on the closed face 104 and longitudinal ribs 112 run along the upper surface 94.

The fender 18 has four holes 114 located for engagement with either the pins 82 on a rear mounting bracket or with the holes and bolt and nut arrangement 31 on a front mounting bracket. In this way the fenders are interchangeable wherein any fender can be used on any mounting bracket.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fender assembly for a road grader wheel, said assembly comprising:
   a fender of resilient synthetic plastic material configured to extend over a part of the periphery of the wheel; and
   a bracket comprising:
      a standard comprising a substantially flat plate;
      standard mounting means at a bottom end of the standard for securing the standard to a part of the grader that is adjacent the wheel and movable with the wheel, the standard mounting means comprising a portion of the plate configured to engage a substantially flat bolt flange of a drive wheel chain case of the grader and bolt holes in the plate for alignment with bolt holes in the bolt flange; and
      fender mounting means at a top end of the standard for fastening the fender to the standard.

2. A fender assembly for a road grader wheel, said assembly comprising:
   a fender of resilient synthetic plastic material configured to extend over a part of the periphery of the wheel; and
   a bracket comprising:
      a standard;
      standard mounting means at a bottom end of the standard for securing the standard to a part of the grader that is adjacent the wheel and movable with the wheel; and
      fender mounting means including a fender support frame at a top end of the standard and comprising fastening means for fastening the fender to the standard, the fastening means comprising a plurality of pins projecting upwardly from the fender support frame, a plurality of openings in the fender for engagement over the pins, and retainer means for engaging the pins to retain the fender thereon.

3. A fender assembly according to claim 2 wherein the fender mounting means comprise a fender support frame cantilevered from the top end of the standard.

4. A fender assembly for a road grader wheel, said assembly comprising:
   a fender of resilient synthetic plastic material configured to extend over a part of the periphery of the wheel; and
   a bracket comprising:
      a standard;
      standard mounting means at a bottom end of the standard for securing the standard to a part of the grader that is adjacent the wheel and movable with the wheel; and
      fender mounting means comprising an arm cantilevered from the top end of the standard, at least one mounting strap secured to and extending across the arm; and
      fastening means for releasably fastening the fender to the fender mounting means.

5. A fender assembly according to claim 4 wherein the fender remains spaced a substantially constant distance from wheel and positioned over said part of the periphery of the wheel.

6. A fender assembly according to claim 4 wherein the standard comprises a column, with the standard mounting means comprising clamp means for clamping the bottom end of the standard to a suspension arm of a grader steerable wheel suspension.

7. A standard according to claim 6 wherein the standard is mounted on the suspension arm such that the standard will move laterally when the wheels of the grader are cambered.

8. A fender assembly according to claim 4 wherein the fastening means comprise: a plurality of openings in the fender, a plurality of openings in the at least one mounting strap for alignment with the openings in the fender, and bolts and nuts for engaging through said aligned openings thereby securing each mounting strap to the fender.

9. A road grader having two chain cases mounted as walking beams on opposite sides of the grader a plurality of wheels including four drive wheels arranged in pairs with the wheels of each pair being mounted in tandem on a respective one of the chain cases, and fender assemblies for the drive wheels, mounted on the chain cases with the fenders extending over the drive wheels, each fender assembly comprising:
   a fender of resilient synthetic plastic material;
   a bracket comprising:
      a standard;
      standard mounting means at a bottom end of the standard securing the standard to one of the chain cases; and
      fender mounting means at a top end of the standard fastening the fender to the standard.

10. The invention according to claim 9 wherein the grader has steerable wheels and steerable wheel suspension means, including suspension arms, mounting the steerable wheels of the grader, and including additional fender assemblies mounted on the suspension arms with additional fenders extending over the steerable wheels.

11. A fender assembly according to claim 10 wherein each additional fender remains spaced a substantially constant distance from a respective steerable wheel.

12. A fender assembly according to claim 10 wherein each additional fender assembly is mounted on the respective suspension arm such that the fender assembly will move laterally when the respective wheel of the grader is cambered.

13. The invention according to claim 9 including an independent fender assembly for each drive wheel.

14. The invention according to claim 13 wherein: the chain case includes a chain cover comprising a substantially flat bolt flange and chain case assembly bolts extending into said bolt flange; the standard comprises a substantially flat plate having bolt holes therein for alignment with the assembly bolts; the standard mounting means comprise a portion of the plate configured to engage the bolt flange of the chain case.

15. The invention according to claim 11 wherein the additional fender assemblies include respective standards and standard mounting clamp means for clamping the standards to respective suspension arms.

16. A road grader having a plurality of wheels and fender assemblies for at least two of said wheels, each fender assembly comprising:

a fender of resilient synthetic plastic material extending over a part of the periphery of a respective wheel; a bracket comprising: a standard; standard mounting means at a bottom end of the standard securing the standard to a part of the grader that is adjacent the associated wheel and that is movable with the associated wheel; fender mounting means at a top end of the standard and comprising releasable and reengageable fastening means releasably fastening the fender to the standard;

and wherein each fender remains spaced a substantially constant distance from a respective wheel and positioned over said part of the periphery of the respective wheel;

and wherein the grader comprises two chain cases mounted as walking beams on opposite sides of the grader; the wheels include four drive wheels arranged in pairs with the wheels of each pair being mounted in tandem on a respective one of the chain cases; and wherein the fender assemblies are mounted on the chain cases with the fenders extending over the drive wheels;

and wherein there is an independent fender assembly for each respective drive wheel;

and wherein the chain case includes a chain cover comprising a substantially flat bolt flange and chain case assembly bolts extending into said bolt flange; the standard comprises a substantially flat plate having bolt holes therein for alignment with the assembly bolts; the standard mounting means comprise a portion of the plate configured to engage the bolt flange of the chain case;

and wherein the grader wheels include steerable wheels and steerable wheel suspension means, including suspension arms, for mounting the steerable wheels of the grader, and wherein the fender assemblies are mounted on the suspension arms with the fenders extending over the steerable wheels;

and wherein each respective fender assembly is mounted on each respective suspension arm such that the fender assembly will move laterally when the respective wheel of the grader is cambered;

and wherein the standard mounting means comprise clamp means for clamping the standards to respective suspension arms.

17. The invention according to claim 16 wherein openings in each respective fender engage the fastening means of any one respective fender mounting means.

* * * * *